Sept. 22, 1959  R. E. SCHELL  2,905,318
AUTOMATIC INSPECTION APPARATUS
Filed June 28, 1952
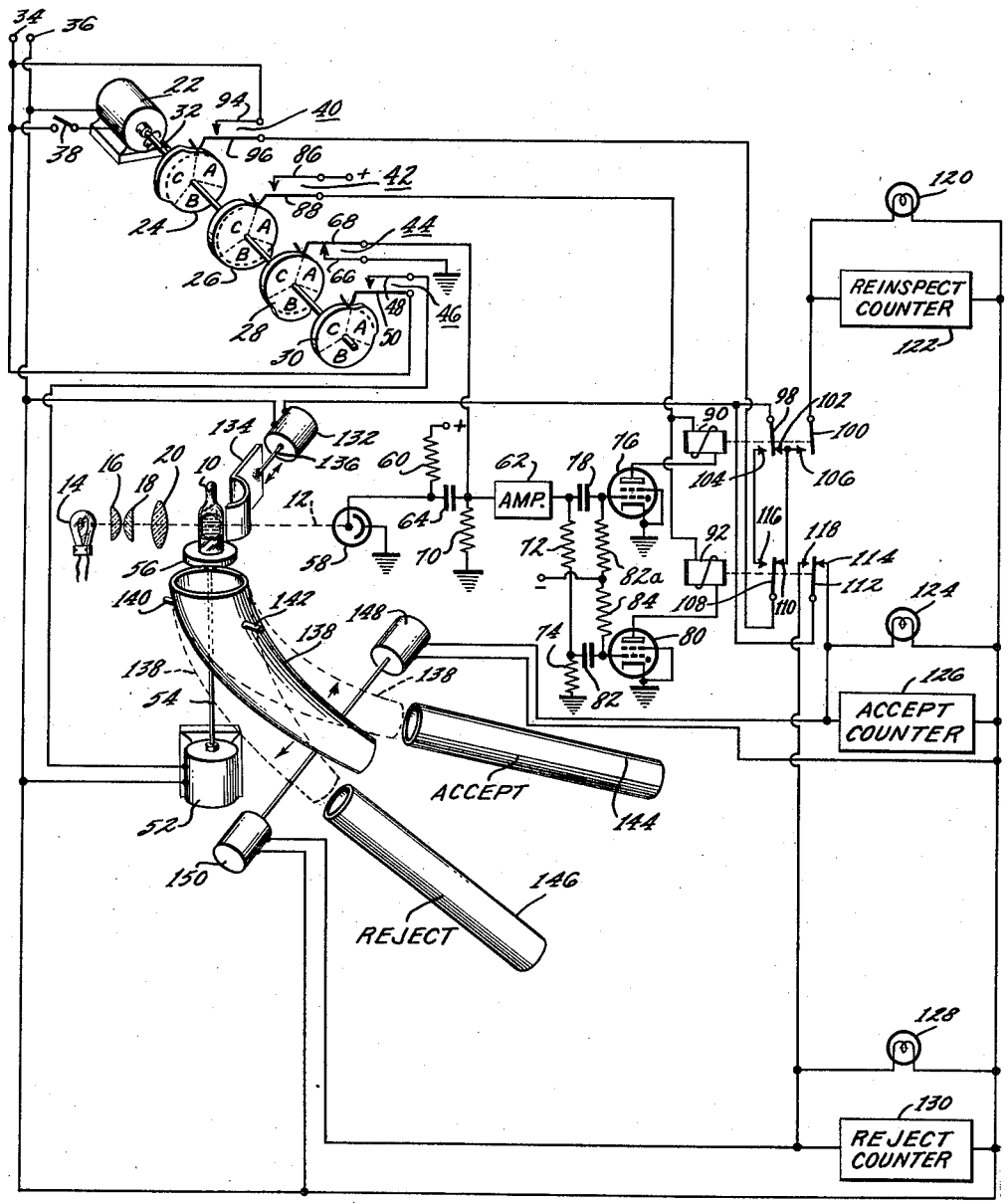
INVENTOR
Roger E. Schell
BY
ATTORNEY United States Patent Office 2,905,318
Patented Sept. 22, 1959

2,905,318

AUTOMATIC INSPECTION APPARATUS

Roger E. Schell, Woodbury, N.J., assignor to Radio Corporation of America, a corporation of Delaware Application June 28, 1952, Serial No. 296,147

8 Claims. (Cl. 209—111)

This invention relates to improvements in automatic inspection apparatus, and more particularly, but not necessarily exclusively, to an improved circuit for inspecting liquid-filled containers by photoelectric means for foreign particles therein, and either accepting, rejecting, or reinspecting the container in accordance with the magnitude of a derived signal. While not specifically limited thereto, the improved circuit of this invention is particularly applicable to the process and apparatus for inspecting fluids disclosed in the U.S. Patent 2,132,447, issued to George Philip Stout on October 11, 1938.

In an inspection system of the type wherein a single article is inspected a number of times and a voltage, or resulting measurement is derived which is some function of a characteristic of the article, a slightly different voltage, or result, may be obtained on each inspection. The distribution of results, about a mean value may be determined by well known statistical principles. The magnitude of variations on either side of the mean value is dependent upon the conditions of inspection as well as the characteristics of the article being inspected. If the article being inspected is close to the accept-reject dividing line, this chance variation of results will make a decision based only on the first inspection statistically unsound, because the result of the first inspection might be on the opposite side of the dividing line from an ultimate average of a number of inspections. This possibility becomes of practical importance when the chance variations are significantly large compared to the precision of inspection that may be required.

In a photo-electric inspection system, of the type used to detect the presence of a foreign particle in a fluid-filled container, the derived signal, which will determine whether a container undergoing inspection is to be accepted or rejected, is substantially proportional to the size of the particle within a range of chance variations. The chance variations in the derived signals are caused mainly by the irregularities of the foreign particle. In the case of an irregularly shaped foreign particle, for instance, a container having such a particle therein may be accepted if the derived signal is caused by the projection of a shadow of minimum area by the particle on the photo-electric cell, or may be rejected if the derived signal is caused by the projected shadow of maximum area by the particle. A photo-electric system, therefore, that will accept or reject an article the derived signal from which is either above or below a certain fixed value may accept articles that should be rejected and may reject articles that should be accepted.

It is, therefore, a general object of this invention to provide an improved circuit, for a photo-electric inspection system of the character described, by means of which articles may be re-examined if the signal derived therefrom is in "a zone of indecision."

It is another object of this invention to provide an improved circuit, for a photo-electric inspection system of the character described, by means of which acceptable articles are segregated from rejectable articles, and articles of doubtful characteristics are reinspected until they are either accepted or rejected.

Still another object of this invention is to provide a novel circuit, for a photo-electric inspection system of the character described, which will accept a liquid-filled container the derived signal from which is below a first critical value, will reject a liquid-filled container the derived signal from which is above a second critical value, and will reinspect a liquid-filled container the derived signal from which lies in a "zone of indecision," that is, in the range between the first critical value and the second critical value, until the container is either accepted or rejected.

It is a further object of this invention to provide a novel circuit, for a photo-electric inspection system of the character described, which is simple in construction and highly efficient in use.

In accordance with the present invention, the foregoing and other related objects and advantages are attained by an improved circuit, for a photo-electric inspection system, by means of which a liquid-filled container undergoing inspection for foreign particles therein is either accepted, rejected, or reinspected. The foreign particle is caused to rotate and modulate a light beam from which a signal is derived. If the derived signal is of a value below a predetermined critical value, means are provided through two, two-position relay switches, in circuit with solenoids, to eject the container into a chute and to align the chute with an acceptance tube. If the container has a foreign particle of undesirable size therein so that the derived signal is greater than a predetermined critical value, the derived signal will trigger two thyratrons, each of which has one of the two-position relay switches in its anode-cathode circuit, and energize the relays. Means are provided, in circuit with both switches, to eject the container into a chute, and to align the chute with a reject tube, whereby the container may be rejected and segregated from the acceptable containers. If the liquid-filled container undergoing inspection contains a particle of borderline size, so that the derived signal is of a value between the "accept" critical value and the "reject" critical value, means are provided to trigger only one thyratron and to energize its associate relay switch. The other relay switch is not energized. Means in circuit with the relay switches in the latter positions prevent the ejection of the container undergoing inspection so that it may be reinspected. The signals derived from a doubtful container lie in a range between the predetermined critical values, which determine the acceptance or rejection of a container, and is narrower than the range of chance variations normally encountered. Unless this were so, the inspection apparatus would never make a decision on an exact borderline container. The choice of width, or range, of the "zone of indecision" involves a compromise between the possibility of an occasional error in decision and the reduction of the inspection rate because of numerous reinspections of borderline ampuls.

A more complete understanding of the invention may be had by reference to the following description of an illustrative embodiment thereof when considered in connection with the single figure of the accompanying drawing in which there is shown a liquid-filled container or ampul 10 in a position for undergoing inspection. A beam of light 12, represented by the dashed line, from a lamp 14 is passed through condenser lenses 16, 18, a collecting lens 20 and the ampul 10. A motor 22 is provided with internal gearing to give a low rotational speed to cams 24, 26, 28 and 30 which are attached to its shaft 32. The motor 22 is connected to a source of power represented by the terminals 34, 36 through a switch 38.

The motor 22 will rotate in a counter clockwise direction, as indicated by an arrow around the shaft, when the switch 38 is closed. Each of the cams 24, 26, 28 and 30 is divided into three sectors A, B and C which represent portions of a complete inspection cycle. There is a raised cam portion associated with sector C of the cam 24, sectors B and C of the cam 26, sector B of the cam 28 and sector A of the cam 30 for the purpose appearing hereinafter. Associated with cams 24, 26, 28 and 30 are a normally opened switch 40, a normally opened switch 42, a normally closed switch 44, and a normally opened switch 46, respectively. At the beginning of the inspection cycle, represented by sector A of the cams, contacts 48 and 50 of the normally open switch 46 close, completing the circuit from the source of power between the terminals 34 and 36 to a motor 52, thereby causing it to rotate. A shaft 54 of the motor 52 is fixed to a platform 56, on which the ampul 10 rests. The rotation of the motor 52 causes the ampul 10 to rotate so that any foreign particles therein will rotate with the liquid therein. When the cam 30 reaches the end of sector A, the contacts 48 and 50 open and cause the motor 52 to stop spinning the ampul 10. The contents of the ampul 10, however, continue to rotate, and any moving foreign particle in the liquid will modulate the light beam 12 passing through the ampul 10. The modulated light beam 12 falls upon the photo-sensitive cathode of a phototube 58, and the modulation of the light beam 12 by the foreign particle causes a modulation of the current flowing through a load resistor 60 in the anode-cathode circuit of the phototube 58. The principle of detecting a foreign particle in the liquid contents of a transparent container, as described, is outlined in greater detail in the above-mentioned Stout Patent 2,132,447.

The anode of the phototube 58 is connected to one end of the load resistor 60 and to an amplifier 62 through a capacitor 64. The other end of the load resistor 60 is connected to a source of suitable unidirectional voltage (not shown). A contact 66 of the switch 44 is connected to ground, and another contact 68 of the switch 44 is connected to the input of the amplifier 62 and to ground through a resistor 70. The signal appearing across the load resistor 60 is passed through the capacitor 64 and, if the contacts 66, 68 of the switch 44 were open, would appear across the resistor 70 and would be applied to the amplifier 62. During the spinning period, however, a large signal in the phototube is caused by the modulation of the light beam 12 by the rotation of the ampul 10, due to irregularities in the glass, dirt on its outer surface, and the turbulence of the liquid. This large signal must not enter the amplifier lest it disturb the operating levels of the various circuits to such an extent that they will not be recovered by the time the actual inspection commences. Therefore, during the time interval of spinning the ampul 10, or through sector A of the cams, the contacts 66, 68 of the switch 44 short circuit the resistor 70 and prevent such unwanted signals from entering the amplifier 62. The output of the amplifier 62 is connected to ground through a resistor 72 in series with a resistor 74, forming a voltage divider. The entire output of the amplifier is impressed upon the grid of a thyratron tube 76 through a coupling capacitor 78. A selected portion of the amplified signal from the amplifier 62, appearing across the resistor 74, is impressed upon the grid of a thyratron tube 80 through a coupling capacitor 82. The grids of the tubes 76 and 80 are connected to a source of negative bias through resistors 82a and 84, respectively. The cathodes of the tubes 76 and 80 are grounded. In order to supply a suitable potential to the anodes of the thyratrons 76, 80, there is provided a source of unidirectional voltage (not shown) which may be applied through the contacts 86 and 88 of the switch 42 to the coils of two, two-position relay switches 90, 92, in the anode-cathode circuits of the tubes 76, 80 respectively.

As motor 22 continues to rotate the cams into sector B, the inspection portion of the cycle commences. The ampul 10 has now been spun and suddenly stopped, and its liquid contents are still rotating. At this point, contacts 66 and 68 open, allowing the signals caused by foreign particles, if any, to enter the amplifier 62. The amplified signals appear across resistors 72 and 74 and are applied through capacitors 78 and 82 to trigger tubes 76 and 80. At the same time that contacts 66 and 68 on cam 28 open, contacts 86 and 88 on cam 26 close, applying a positive potential to the anodes of trigger tubes 76 and 80 to the coils of relays 90 and 92, respectively. Trigger tubes 76 and 80 are gas filled tubes, commonly referred to as thyratrons, which possess the property of passing no anode current as long as the control grid is kept sufficiently negative, with respect to the cathode, but once the control grid potential is made less negative than a certain critical value, even momentarily, the gas within the tube is ionized, and anode current begins to flow at a value largely determined by circuit conditions external to the tube. Once the gas within the tube is ionized and anode current is flowing, the control grid is powerless to further influence the anode current within practical bounds. To stop the flow of anode current, it is necessary to reduce the value of the applied anode potential below a low critical value. The tube thus has a trigger-like property whereby the control grid can change the anode current from a no-current to a full-current condition, but after it has done so it can have no further effect on it.

The signal applied through capacitors 78 and 82 appear across the resistors 82a and 84, and is impressed on the control grids of trigger tubes 76 and 80. Resistors 82a and 84 are connected to a source of negative potential (not shown) which is amply sufficient to prevent the tubes from normally becoming conductive. Tube 76 receives the full amplitude of the signal from amplifier 62, but tube 80 receives only a portion of that signal due to the voltage dividing action of resistors 72 and 74. The amplitude of the signal received by tube 80 is the ratio of the resistance of resistor 74 to the combined resistance of resistors 74 and 72.

If there is no foreign particle in ampul 10 being inspected, there will be no modulation of light beam 12, no modulation of current in phototube 58, no signal entering amplifier 62, and no signal applied to trigger tubes 76 and 80. Neither trigger tube will be made conductive, and neither relay 90 or 92 will operate.

If there is a large foreign particle in ampul 10, it is evident that with the proper amount of amplification in amplifier 62, there will be a large signal applied to trigger tube 76. The positive elements of that signal will be more than sufficient to overcome the negative bias applied to tube 76, and the tube will be rendered conductive. Even though the signal amplitude applied to trigger tube 80 is of lesser amplitude than that applied to tube 76, as described earlier, the reduced signal in this case is still sufficient to ionize tube 80. Therefore, both trigger tubes are rendered conductive, and both relays 90 and 92 will be energized.

Now consider a borderline size of particle in ampul 10 which is so close to the size chosen as the dividing line between an acceptable ampul and a rejectable ampul that chance variations, such as orientation of an irregularly shaped foreign particle, for example, would cause the decision of the machine to be based largely on chance, and hence unsound. In this case, with the amplification of amplifier 62 properly adjusted, the signal applied to trigger tube 76 is sufficient to render it conductive, and energize relay 90. However, the reduced amplitude of signal applied to trigger tube 80 in this case is not enough to overcome the negative bias and the tube remains non-conductive. Hence, in case of a borderline size particle, relay 90 is energized and relay 92 is not.

The inspection period continues to the end of sector B on the cams at which time the contacts 66 and 68 of the switch 44 close, short-circuiting the input to amplifier 62. This prevents any signals arising from the ejection of the ampul from entering the amplifier. Sector C on the cams controls the ejection and selection of the ampul just inspected. It will be noticed that contacts 86 and 88 of the switch 42 remain closed during the period of sector C to cause trigger tubes 76 and 80 to continue to conduct current and operate relays 90 and 92, providing either or both were operated during the preceding inspection period. This provides a memory function to control the proper selection of the ampul just inspected.

The closing of contacts 94 and 96 of the switch 40 at the beginning of sector C energizes circuits performing three functions: the ejection of the ampul out of the inspection position and the feeding in of a new ampul, the selection of the ampul causing it to leave the machine through either the "accept" or the "reject" tube determined by the results of the preceding inspection, and the indication of the inspection results on appropriate pilot lamps and counters.

The two-position relay switch 90 comprises two movable armatures 98 and 100. When the relay switch 90 is not energized, the armature 98 is biased against a relay contact 102. When the relay switch 90 is energized, the armature 98 is moved into contact with a relay contact 104, and the armature 100 is moved into contact with a relay contact 106. In an unenergized position of the relay switch 92, an armature 108 is in contact with a relay contact 110, and an armature 112 is in contact with a relay contact 114. When the relay switch 92 is energized, the armature 108 is moved into contact with a relay contact 116 and the armature 112 is moved into contact with a relay contact 118. The contacts 102, 106 of the relay switch 90 are connected to the contact 110 of the relay switch 92. The armature 108 of the relay switch 92 is connected to the terminal 34 through the switch 40. The armature 100 is connected in series with a lamp 120 to the terminal 36. A reinspection counter 122 is connected across the lamp 120. The purpose of the reinspection counter 122 is to count the number of reinspections made. A lamp 124, and an accept counter 126 in parallel therewith, are connected between the contact 114 of the switch 92 and the terminal 36. The accept counter 126 records the number of containers, or ampuls, accepted. The contact 118 of the switch 92 is connected through the parallel circuit comprising a lamp 128 and a reject counter 130 to the terminal 36. The reject counter 130 records the number of containers, or ampuls, rejected. The armature 98 of the relay switch 90 is connected to an armature 112 of the switch 92 and to the terminal 36 through a solenoid 132. An ejector mechanism 134 is connected to the solenoid 132 by an armature 136 for the purpose of ejecting the ampul 10 after it has undergone inspection. The ejected ampul will fall into the mouth of a funnel shaped chute 138. The chute 138 is pivotable about pins 140 and 142 fixed to the upper part of the chute 138. The chute 138 may be swung through a limited arc so that in one extreme position it may be aligned with an accept tube 144 and in the other extreme position it will be aligned with a reject tube 146. A solenoid 148 connected between the contact 114 of the relay switch 92 and the terminal 36 has an armature connected to the lower end of the chute 138 whereby the latter may be aligned with the accept tube 144, when the solenoid 148 is energized. A solenoid 150 has its armature connected to the lower end of the chute 138 for pulling the chute 138 into alignment with the reject tube 146, when energized. The solenoid 150 is connected between the contact 118 of the relay switch 92 and the terminal 36. The counters 122, 126 and 130 are of the conventional type adapted to register upon the application of a current therethrough.

In the case of an ampul containing either no particles or very small ones well below the limit of rejection, neither relay switch 90 or 92 is energized, as described earlier, and current flows from terminal 34 through contacts 94 and 96, through relay contacts 108, 110, 102 and 98, through solenoid 132 causing it to operate, and back to terminal 36. Operation of solenoid 132 causes ejector mechanism 134 to move forward forcing the ampul 10 out of the inspection position on platform 56, and causing it to fall into chute 138. Guide plates (not shown) may be provided to insure the ampul 10 falling into chute 138. The forward motion of ejector mechanism 134 also feeds another ampul into the inspection position on platform 56 ready for the next inspection.

Current also flows from relay contact 98 through relay contacts 112 and 114 to pilot lamp 124 and accept counter 126 causing them to register the fact that the ampul was accepted, and to solenoid 148 causing it to pull chute 138 into alignment with the accept tube 144, allowing the ejected ampul to pass into the accept tube. Current through the lamp 124, counter 126 and solenoid 148 returns to the terminal 36.

In the case of an ampul having a large foreign particle, both relays 90 and 92 will be operated as described earlier. In this case current flows from terminal 34 through contacts 94 and 96, through relay contacts 108, 116, 104 and 98 to solenoid 132 causing ejector 134 to operate, ejecting the ampul 10 and feeding in another ampul as before. Current also flows through relay contacts 112 and 118 to the pilot lamp 128 and reject counter 130 causing them to register the fact that the ampul was rejected, and to solenoid 150 causing it to pull the chute 138 into alignment with the reject tube 146, allowing the ejected ampul to pass into the reject tube. Current from lamp 128, counter 130 and solenoid 150 returns to the terminal 36.

In the case of a borderline particle in ampul 10, relay switch 90 will be energized and relay switch 92 will not, as described earlier. Current from terminal 34 via contacts 94 and 96, therefore, cannot get from contacts 108 and 110 on relay switch 92 to contact 98 on relay switch 90, since contacts 98 and 102 are open. Therefore, ejector solenoid 132 is not energized, nor are the accept or reject pilot lamps, counters, or selector solenoids. Hence, the ampul 10 will remain in place for another inspection on the next cycle. Contacts 106 and 100 on relay switch 90 are now closed, however, and current will flow from contact 110 to the reinspect pilot lamp 120 and counter 122 registering the fact that the ampul is borderline and is being held for another inspection.

At the end of sector C on the cams, contacts 94 and 96 open, de-energizing the ejector, selector and indicating circuits. Contacts 86 and 88 on cam 26 open, removing the potential from the trigger tubes 76 and 80, allowing them to de-ionize if they had been conductive during the preceding inspection, and preparing them for the next inspection.

There has, thus, been described, in accordance with the objects and advantages of the present invention, a novel circuit by means of which containers undergoing inspection may be reinspected when the signal from such a container is in a "zone of indecision" so as to make a decision of either acceptance or rejection of doubtful value. This action may be compared to a human operator taking a second, or even a third, look in cases where there is doubt as to whether or not the article inspected is satisfactory.

While the inspection machine disclosed herein has been described in connection with timing means including a motor, cams and switches, the apparatus may employ conventional electronic timing circuits, well known in the art, in order to provide a greater flexibility of operation.

What is claimed is:

1. In an inspection system of the type used to detect the presence of a foreign particle in a transparent fluid-filled container, said system comprising means to pass a beam of light through said container, means to cause said particle to move and to modulate said light beam, and means including light sensitive means intercepting said beam to obtain an electrical signal of a magnitude substantially proportional to the size of said particle; the combination therewith of a circuit comprising a pair of gas tubes each having at least a cathode, a grid and an anode, means to apply all of said signal from said signal obtaining means to said grid of one of said gas tubes, means to apply only a selected portion of said signal from said signal obtaining means to said grid of the other of said gas tubes, a pair of two-position relay switches each having an actuating coil, means connecting a separate one of said coils in series with the anode-cathode path of each of said gas tubes, means to apply an operating voltage between said anode and said cathode of each tube, means connected to said grids of said tubes to bias said tubes off when said signal is smaller than a first critical voltage, to cause both of said tubes to conduct when said signal is greater than a second critical voltage, and to cause only one of said tubes to conduct when said signal is between said first and second critical voltages, each of said switches being in a first position thereof in the absence of current through its associated tube and in a second position thereof when its associated tube is conducting, means in circuit with said switches each in said first position thereof to move said container out of the path of said light beam and to direct said container along a first predetermined path, means including a portion of said last-mentioned means and said moving means in circuit with said switches each in said second position thereof to direct said container along a second predetermined path, and said switches comprising means to disconnect said moving means from being in circuit therewith when one of said switches is in said first position thereof and another is in said second position thereof, whereby said container may be reinspected.

2. In an inspection system of the type used to detect the presence of a foreign particle in a transparent fluid-filled container, said system comprising means to pass a beam of light through said container, means to cause said particle to move and to modulate said light beam, and means including light sensitive means intercepting said beam to obtain an electrical signal of a magnitude substantially proportional to the size of said particle; the combination therewith of a circuit comprising a pair of gas tubes each having at least a cathode, a grid and an anode, means to apply all of said signal from said signal obtaining means to the grid of one of said gas tubes, means to apply only a selected portion of said signal from said signal obtaining means to the grid of the other of said gas tubes, a pair of two-position relay switches each having an actuating coil, means connecting a separate one of said coils in series with the anode-cathode path of each tube, means to apply an operating voltage between said anode and said cathode of each tube, means connected between said grid and said cathode of each tube to bias said tubes off when said signal is smaller than a first critical voltage, to cause both of said tubes to conduct when said signal is greater than a second critical voltage, and to cause only one tube to conduct when said signal is between said first and second critical voltages, each of said switches being in a first position thereof in the absence of current through its associated tube and in a second position thereof when its associated tube is conducting, an eject solenoid, an accept solenoid, means connecting said eject solenoid and said accept solenoid in circuit with said switches each in said first position thereof to energize said solenoids whereby to accept said container, a reject solenoid, means including a portion of said last-mentioned means connecting said eject solenoid and said reject solenoid in circuit with said switches each in said second position thereof to energize them whereby to reject said containers, and said switches comprising means to disconnect said solenoids from said energizing means when one of said switches is in said first position thereof and another is in said second position thereof whereby said container may be reinspected.

3. In a photo-electric inspection system, of the type used to detect the presence of a foreign particle in a transparent fluid-filled container, comprising means to pass a light beam through said container at a test station, means to rotate said container momentarily whereby to move said particle and to modulate said light beam by said particle when said container has stopped rotating, and means including light sensitive means in the path of said beam to obtain an electrical signal from said modulated light beam of a magnitude substantially proportional to the size of said particle; a circuit comprising a pair of thyratrons each having at least a cathode, a grid and an anode, a voltage divider, means connecting said voltage divider to said signal obtaining means, means connected between said voltage divider and the grid of one of said thyratrons to apply all of said signal thereto, means connected from a point on said voltage divider to the grid of the other of said thyratrons to apply only a selected portion of said signal thereto, a pair of two-position relay switches each having an actuating coil, means connecting a separate one of said coils in the anode-cathode path of each of said thyratrons to actuate said switches when said thyratrons conduct, bias means connected to each of said grids to cause each of said tubes to be cut off when said signal is smaller than a first critical voltage, to cause both of said thyratrons to conduct when said signal is greater than a second critical voltage, and to cause one of said thyratrons to conduct and to cause the other of said thyratrons to be cut off when said signal is between said first and second critical voltages, each of said switches being in a first position thereof when its associated thyratron is cut off and in a second position thereof when its associated thyratron is conducting, means in circuit with said switches each in said first position thereof to eject said container from said test station and to direct said container along a first predetermined path, means including a portion of said last-mentioned means and said ejecting means in circuit with said switches each in said second position thereof to direct said container along a second predetermined path, said switches comprising means to prevent said ejection means from operating when one of said switches is in said first position thereof and the other is in said second position thereof.

4. In a photo-electric inspection system, of the type used to detect the presence of a foreign particle in a transparent fluid-filled container, comprising means to pass a light beam through said container at a test station, means to rotate said container momentarily whereby to move said particle and to modulate said light beam by said particle when said container has stopped rotating, and means including light sensitive means intercepting said beam to obtain an electrical signal from said modulated light beam of a magnitude, substantially proportional to the size of said particle; a circuit comprising a pair of thyratrons each having at least a cathode, a grid and an anode, a voltage divider, means connecting said voltage divider to said signal obtaining means, means connected between said voltage divider and the grid of one of said thyratrons to apply all of said signal thereto, means connected from a point on said voltage divider to the grid of the other of said thyratrons to apply only a selected portion of said signal thereto, a pair of two-position relay switches each having an actuating coil, means connecting a separate one of said coils in the anode-cathode path of each of said thyratrons to actuate said switches when said thyratrons conduct, bias means connected to each of said grids to cause each of said thyratrons to be cut off when said signal is smaller than a first critical voltage, to cause both of said thyratrons to conduct when said signal is greater than a second critical voltage, and to cause one of said thyratrons to conduct and to cause the other of said thyratrons to be cut off when said signal is between said first and second critical voltages, each of said switches being in a first position thereof when its associated thyratron is cut off and in a second position thereof when its associated thyratron is conducting, an eject solenoid, an accept solenoid, means connecting said solenoids in circuit with said switches each in said first position thereof to eject said container from said test station and to direct said container along a first predetermined path, a reject solenoid, means including a portion of said last-mentioned means connecting said eject and said reject solenoids in circuit with said switches each in said second position thereof, to eject said container from said test station and to direct said container along a second predetermined path, said switches comprising means to prevent said soleonids from operating when one of said switches is in said first position thereof and the other is in said second position thereof whereby said container undergoing inspection may undergo reinspection.

5. In a photo-electric inspection system, of the type used to detect the presence of a foreign particle in a transparent fluid-filled container, comprising means to pass a light beam through said container at a test station, means to move said particle and to modulate said beam by said particle only, and means including light sensitive means intercepting said beam to obtain an electrical signal of a magnitude substantially proportional to the size of each particle; a circuit comprising two electrically interconnected two-position relay switches, each of said switches being biased normally in a first position thereof, means responsive to said signal from said signal obtaining means when said signal is a voltage between a first critical voltage and a second critical voltage to actuate only one of said relay switches in a second position thereof, said last-mentioned means comprising means to actuate both of said switches in a second position thereof when said signal voltage is greater than said second critical voltage, an eject solenoid, an accept solenoid, means connecting said solenoids in circuit with said switches when each is in a first position thereof to energize said solenoids, a reject solenoid, means including a portion of said last-mentioned means connecting said reject solenoid and said eject solenoid in circuit with said switches when each is in said second position thereof to energize said eject and reject solenoids, said relay switches comprising means to disconnect said eject solenoid from said energizing means when one of said switches is in said first position thereof and the other of said switches is in said second position thereof.

6. In a photo-electric inspection system, of the type used to detect the presence of a foreign particle in a transparent fluid-filled container, comprising means to pass a light beam through said container at a test station, means to move said particle and to modulate said beam by said particle only, and means including light sensitive means disposed in the path of said beam to obtain an electrical signal of a magnitude substantially proportional to the size of each particle; two-position relay switches, each of said switches being biased normally in a first position thereof, means connected between said relay switches and said signal obtaining means and responsive to said signal when said signal is a voltage between a first critical value and a second critical value to actuate only one of said relay switches in a second position thereof, said last-mentioned means comprising means to actuate both of said switches in a second position thereof when said signal voltage is greater than said second critical voltage, an eject solenoid, an accept solenoid, means connected in circuit with said solenoids and said switches when each is in said first position thereof to energize said solenoids, a reject solenoid, means including a portion of said last-mentioned means connecting said eject solenoid and said reject solenoid in circuit with said relay switches when each is in said second position thereof to energize said eject and reject solenoids, said switches comprising means to disconnect said solenoids from said energizing means when one of said switches is in said first position thereof and the other of said switches is in said second position thereof, and switching means connected to said signal obtaining means to short circuit said signal obtaining means except during said modulation of said light beam by said particle.

7. The combination in a photo-electric inspection system, of the type used to detect the presence of a foreign particle in a transparent fluid-filled container comprising means to pass a light beam through said container, means to revolve said container and to stop it suddenly to cause said particle to oscillate and to modulate said beam, means including light responsive means in the path of said beam to obtain an electrical signal from said modulated beam of a magnitude substantially proportional to the size of said particle, means connected to said signal obtaining means to short circuit said signal obtaining means when said container is revolving, a pair of gaseous tubes each having at least a cathode, a grid and an anode, means to apply all of said signal from said signal obtaining means to the grid of one of said tubes, means to apply only a portion of said signal from said signal obtaining means to the grid of the other of said tubes, a separate coil from a separate two-position relay switch connected in series with the anode-cathode path of each of said tubes, each of said switches being biased normally in a first position thereof, means connected between the grid and cathode of each of said tubes to bias each of said tubes to cut off when said signal applied thereto is smaller than a first critical voltage, to permit triggering on of both of said tubes in response to a signal greater than a second critical value, and to prevent only one of said tubes from firing when said signal is of a voltage between said first and second critical voltages, each of said switches being biased to a second position thereof when its associated tube is conducting, ejection means and an accept relay connected in a first energizing circuit with said switches when each is in said first position thereof, a reject relay and said ejection means being connected in a second energizing circuit with said switches and a portion of said first circuit when each of said switches is in said second position thereof, said switches comprising means to break said first and said second energizing circuits when one of said switches is in the first position thereof and the other in a second position thereof.

8. A circuit comprising a pair of gaseous conduction tubes each having an anode, a cathode, and a grid means to apply a voltage to the grid of one of said tubes, means to apply a selected fraction of said voltage to the grid of the other of said tubes, means to cause conduction through said tubes when the voltages applied to their grids are sufficient to trigger said tubes, a separate two-position relay switch in the anode-cathode circuit of each tube and adapted to be energized by conduction through the tube, a first circuit including said relay switches in a first position thereof, a second circuit including a portion of said first circuit and said relay switches in a second position thereof when both of said relay switches are energized, a first solenoid, a second solenoid, means connecting said first and said second solenoids in said first circuit to energize them, a third solenoid, means connecting said first and said third solenoids in said second circuit including a portion of said first circuit to energize them when said relay switches are energized, said relay switches comprising means to disconnect said solenoids from said energizing means when only one of said relay switches is energized.

(References on following page)

References Cited in the file of this patent

UNITED STATES PATENTS

| | | | |
|---|---|---|---|
| 2,008,563 | Sarbey | July 16, | 1935 |
| 2,051,695 | Glacy | Aug. 18, | 1936 |
| 2,132,447 | Stout | Oct. 11, | 1938 |
| 2,186,196 | Haugh | Jan. 9, | 1940 |
| 2,192,580 | Sachtleben | Mar. 5, | 1940 |
| 2,266,779 | Laughridge et al. | Dec. 23, | 1941 |
| 2,312,357 | Odquist | Mar. 2, | 1943 |
| 2,317,559 | Stout | Apr. 27, | 1943 |
| 2,347,714 | Sorensen | May 2, | 1944 |
| 2,363,577 | Dexter | Nov. 20, | 1944 |
| 2,531,529 | Price | Nov. 28, | 1950 |
| 2,635,194 | Kellogg et al. | Apr. 14, | 1953 |
| 2,688,441 | Merrill et al. | Sept. 7, | 1954 |
| 2,748,936 | Arlin | June 5, | 1956 |
| 2,849,115 | Tooker | Aug. 26, | 1958 |